United States Patent [19]

Shimizu et al.

[11] Patent Number: 5,683,632
[45] Date of Patent: Nov. 4, 1997

[54] METHOD AND APPARATUS FOR AUTOMATICALLY SUPPLYING A MOLDING MATERIAL

[75] Inventors: Hideo Shimizu; Hozumi Tanaka, both of Tokyo, Japan

[73] Assignee: Toyo Ink Manufacturing Co., Ltd., Tokyo, Japan

[21] Appl. No.: 536,057

[22] Filed: Sep. 29, 1995

[30] Foreign Application Priority Data

Aug. 10, 1995 [JP] Japan ................................. 7-204161

[51] Int. Cl.⁶ .................. B29B 7/24; B29C 47/10
[52] U.S. Cl. .............. 264/40.4; 264/349; 366/76.1; 366/141; 366/152.2; 366/152.6; 425/148
[58] Field of Search .................. 264/40.1, 40.4, 264/349; 425/140, 147, 148; 366/76.1, 141, 152.2, 152.6

[56] References Cited

U.S. PATENT DOCUMENTS

4,955,550 9/1990 Satake et al. .
5,098,635 3/1992 Widmer ........................... 264/130
5,213,724 5/1993 Saatkamp ....................... 264/40.4

*Primary Examiner*—Mathieu D. Vargot
*Attorney, Agent, or Firm*—Knobbe, Martens, Olson & Bear, LLP

[57] ABSTRACT

A method and apparatus are provided which can automatically and securely supply a molding machine with natural resin pellets and masterbatch pellets at a predetermined mixture ratio, and which is excellent in performance and costs. A natural resin feeder and a masterbatch feeder are connected to a chute of the molding machine via respective tubes. The amount of the natural resin pellets and the amount of the masterbatch pellets which are air-transferred through the respective tubes are controlled such that they are transferred in accordance with the predetermined mixture ratio. The chute and the raw material supply port of the molding machine is connected by a pipe whose cross-sectional area at the upper portion is substantially equal to or smaller than that at the lower portion thereof. The natural resin feeder and the masterbatch feeder are intermittently operated in accordance with signals from an upper limit level meter and a lower limit level meter provided on the pipe.

20 Claims, 6 Drawing Sheets

METHOD AND APPARATUS FOR AUTOMATICALLY SUPPLYING A MOLDING MATERIAL

BACKGROUND OF THE INVENTION

1. Field of the Invention

The present invention relates to a method and apparatus for automatically supplying a molding material to a molding machine such as an injection molding machine or an extruder, and more particularly to a method and apparatus for automatically supplying a molding material by utilizing a masterbatch method to mix additives into molds made of a thermoplastic resin.

2. Description of the Related Art

In the masterbatch method, a predetermined amount of a pelletized masterbatch is mixed with a pelletized natural resin (molding resin material including no additive), and they are plasticized and kneaded in a molding machine so that additives in the masterbatch are dispersed into the natural resin so as to obtain molds containing the additives.

In this specification, the term "masterbatch" means a thermoplastic resin into which additives such as colorant, stabilizer, antistatic agent and fire retardant are dispersed in high concentration and which is usually pelletized.

In a conventional mixing stage utilizing the masterbatch method, a natural resin and a masterbatch are mixed together using a mixer such as a tumble mixer or a Henschel mixer as a batch process, and the mixture is then supplied into a hopper of a molding machine. However, in such a batch mixing process using a mixer, the mixer must be washed when the kind or color of molds is changed. The washing, which takes a few hours, considerably hinders the smoothness of flow of the process.

Also, it is necessary to provide a space for installing the mixer as well as a space for temporarily storing the uniform mixture of the natural resin and the masterbatch which is prepared by the mixer as a molding material. Especially, when a plurality of molding machines are used, the above-mentioned installation space and storage space become considerable. In addition, the amount of energy consumed by the mixer is large.

Moreover, the natural resin and the masterbatch, which are supplied from the mixer to the hopper of the molding machine as a uniform mixture, separate in the hopper due to vibrations, static electricity caused by the flow of the material in the hopper, or other causes, so that it is difficult to obtain molded products in which the masterbatch is uniformly mixed with the natural resin.

Figure 6:
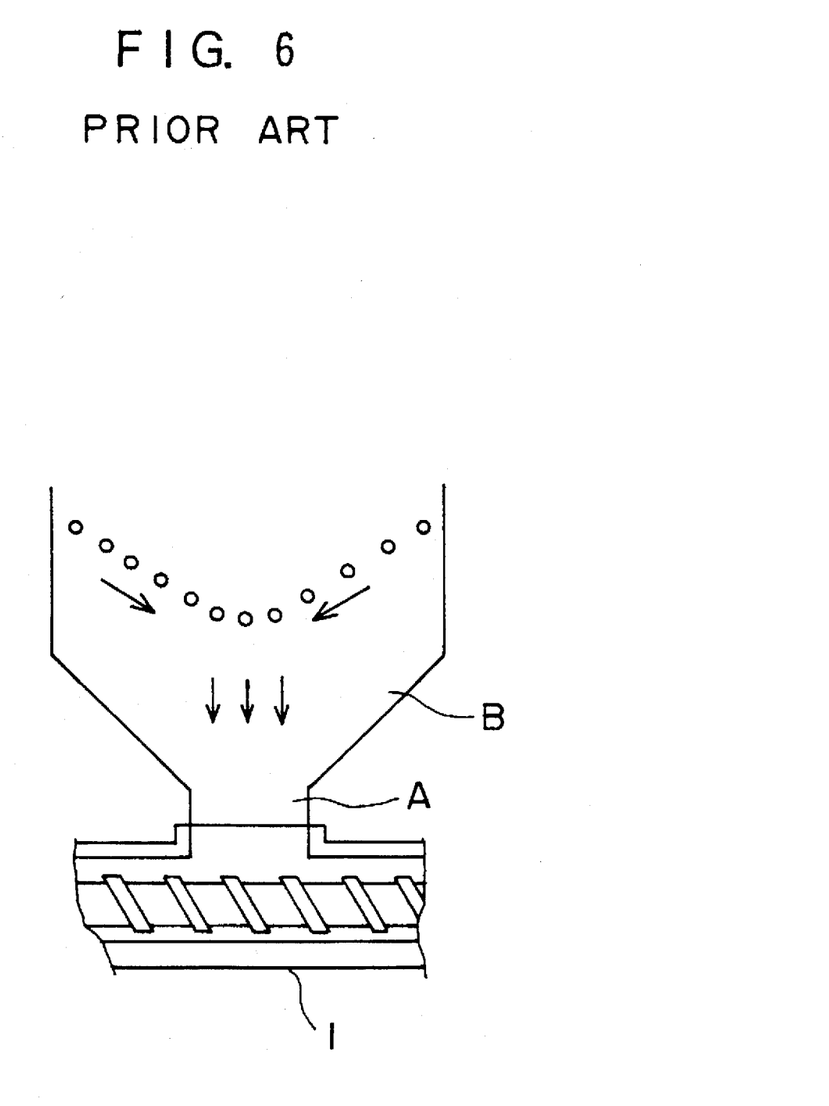
FIG. 6 is a sectional view showing a hopper connected to a raw material supply port of a conventional molding machine and the flow of pellets in the hopper.

This problem will be described in detail with reference to FIG. 6 which shows a conventional hopper. Pellets flow downward at a uniform speed in region A above a raw material supply port of a molding machine 1. However, in region B which has a larger cross-sectional area compared to the raw material supply port, the pellets flow, at the surface, from the peripheral portion to the central portion in accordance with the angle of repose of the pellets while forming a cone shape. At this time, pellets of the natural resin (hereinafter referred to as "natural resin pellets") and pellets of the masterbatch (hereinafter referred to as "masterbatch pellets") separate due to the difference in fluidity which is caused by the difference in the specific gravities of the pellets. Such separation also occurs due to static electricity caused by the flow of the pellets.

However, although this method has the above-described defects, it is frequently used because of its convenience in case of molding a small quantity of lots.

To improve the above-described batch mixing process, automation of metering and mixing has been proposed, and various systems have been put into practice. Presently, a system is known in which a mixer is disposed on the raw material supply port of a molding machine, and a constant feeder for a natural resin and a constant feeder for a masterbatch are separately provided for the mixer. Also, another system is known in which a mixer, a constant feeder for a masterbatch, and a costant feeder for a natural resin are successively superposed on a molding machine. However, in these batch systems utilizing mixers, various apparatuses are disposed on the molding machines. Therefore, disassembly for cleaning is considerably troublesome. In addition, the above-described separation between the natural resin and the masterbatch in the hopper of the molding machine cannot be prevented.

In another known system, a constant feeder for a masterbatch is provided on a molding machine to supply the raw material supply section of the molding machine with a constant amount of a masterbatch, which is then mixed with a natural resin supplied from a hopper which is separately provided on the molding machine. This system also has the drawback that disassembly for cleaning is considerably troublesome, because additional apparatuses are disposed on the molding machine. Also, the supply of the masterbatch to the constant feeder for the masterbatch must be performed manually or by use of a special apparatus. Also, when the metering of the masterbatch is performed in a volumetric manner, it is impossible to detect abnormal states such as a state in which the masterbatch includes substandard pellets, or a state in which masterbatch pellets are not supplied for some reason. Also, it cannot cope with the case where the bulk density of the masterbatch changes. When the metering of the masterbatch is performed by measuring its weight, the above-described problems in relation to the metering can be overcome. However, since a device for measuring the weight must be built on the molding machine, the entire structure of the machine becomes more complex, which makes disassembly and cleaning more troublesome.

SUMMARY OF THE INVENTION

An object of the present invention is to solve the foregoing various problems and to provide a method and apparatus for automatically supplying a molding material, which are excellent in performance and costs.

The present invention provides a method of automatically supplying a molding material to a molding machine. The method comprising the steps of vertically disposing a pipe on a raw material supply port of the molding machine, an upper portion of the pipe having a cross-sectional area substantially equal to or smaller than that of a lower portion of the pipe, supplying natural resin pellets fed from a natural resin feeder and masterbatch pellets fed from a masterbatch feeder to the pipe as the molding material, and providing the pipe with an upper limit level meter for detecting that the molding material supplied reaches an upper limit level of the pipe and a lower limit level meter for detecting that the molding material supplied reaches a lower limit level of the pipe. When it is detected by the lower limit level meter that the molding material has reached the lower limit level of the pipe, the natural resin feeder and the masterbatch feeder are operated while the amount of the natural resin pellets supplied from the natural resin feeder and the amount of the masterbatch pellets supplied from the masterbatch feeder are controlled such that the natural resin pellets and the masterbatch pellets are supplied to the pipe at a predetermined mixture ratio. When it is detected by the upper limit level meter that the molding material has reached the upper limit level of the pipe, the natural resin feeder and the masterbatch feeder are stopped.

Also, the present invention provides an apparatus for automatically supplying a molding material to a molding machine. The apparatus comprises a pipe for connecting a raw material supply port of the molding machine with a chute, which is provided above the molding machine to receive the molding material. An upper portion of the pipe has a cross-sectional area substantially equal to or smaller than that of a lower portion of the pipe. A natural resin feeder and a masterbatch feeder are provided to supply natural resin pallets and masterbatch pallets to the pipe via the chute as the molding material. Also, an upper limit level meter and a lower limit level meter are provided on the pipe to detect that the molding material supplied reaches an upper limit level and a lower limit level of the pipe. When it is detected by the lower limit level meter that the molding material has reached the lower limit level of the pipe, the natural resin feeder and the masterbatch feeder are operated while the amount of the natural resin pellets supplied from the natural resin feeder and the amount of the masterbatch pellets supplied from the masterbatch feeder are controlled such that the natural resin pellets and the masterbatch pellets are supplied to the chute at a predetermined mixture ratio. When it is detected by the upper limit level meter that the molding material has reached the upper limit level of the pipe, the natural resin feeder and the masterbatch feeder are stopped.

When the lower limit level meter detects that the molding material has reached the lower limit level of the pipe, the pipe is supplied with the molding material which includes natural resin pellets and masterbatch pellets mixed in a predetermined ratio. When the upper limit level meter detects that the molding material has reached the upper limit level of the pipe, the natural resin feeder and the masterbatch feeder are stopped. With this operation, the molding material is stored in the pipe such that the level of the molding material is maintained between the upper limit level and the lower limit level of the pipe. Since the pipe connected to the raw material supply port has a shape such that the cross-sectional area at the upper portion is substantially equal to or smaller than that at the lower portion, the natural resin pellets and the masterbatch pellets of the molding material in the pipe move downward together while maintaining the original mixture ratio in any horizontal cross section, so that the molding machine is supplied with the molding material which contains the natural resin pellets and the masterbatch pellets mixed in a predetermined ratio. As described above, in the present invention, the ratio between the natural resin pellets and the masterbatch pellets in the molding material is maintained at a predetermined ratio without using a mixer. In addition, the problem of separation between the natural resin pellets and the masterbatch pellets does not occur. Also, since no mixer is used, it is unnecessary to wash a mixer even when the kind or color of parts is changed. Accordingly, the process flow is not hindered, and installation space for a mixer becomes unnecessary. Also, the total energy consumption can be reduced, because of the absence of a mixer. Moreover, even when the metering of the masterbatch is performed by measuring its weight, the device for measuring its weight is not required to be built on the molding machine and can be disposed in the vicinity of the masterbatch feeder. Accordingly, the molding machine does not become complex.

The above and other objects, features, and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENT

Embodiments of the present invention will now be described with reference to the accompanying drawings.

First Embodiment

Figure 1:
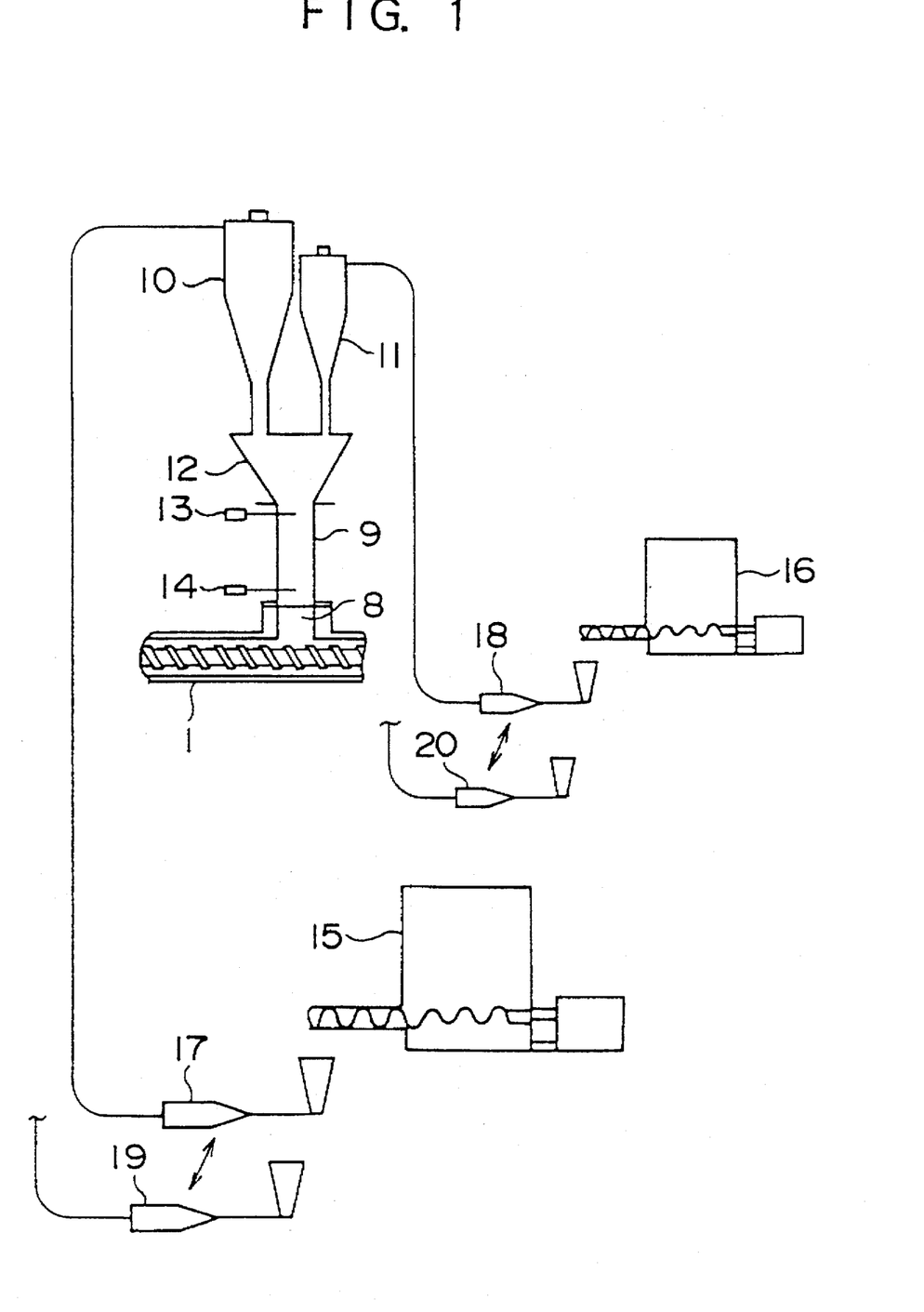
FIG. 1 is a schematic illustration showing a first embodiment of an automatic molding-material supply apparatus according to the present invention.

FIG. 1 shows a first embodiment of the present invention. As shown in FIG. 1, a pipe 9 is vertically disposed on a raw material supply port 8 of a molding machine 1. The pipe 9 has a substantially constant cross-sectional area at all axial positions from its upper end to lower end. Pellets of a raw material, i.e., a molding material in the pipe 9 uniformly moves downward to the raw material supply port 8 of the molding machine 1. A chute 12 is attached to the upper end of the pipe 9, and a cyclone 10 for natural resin and a cyclone 11 for masterbatch are set on the chute 12. An upper limit level meter 13 and a lower limit level meter 14 are attached to the pipe 9. The upper limit level meter 13 detects that the level of the supplied pellets reaches a predetermined upper limit level of the pipe 9, while the lower limit level meter 14 detects that the level of the pellets reaches a predetermined lower limit level of the pipe 9. A natural resin supplied from a natural resin feeder 15 and a masterbatch supplied from a masterbatch feeder 16 are air-transported to the cyclones 10 and 11 via air transporters 17 and 18, respectively.

The above-described system operates as follows. The natural resin and the masterbatch are melted, mixed and consumed by the molding machine 1. When it is detected by the lower limit level meter 14 that the level of the pellets has reached the lower limit level of the pipe 9, the natural resin feeder 15 and the masterbatch feeder 16 are operated to supply the natural resin and the masterbatch and to control the amount of the natural resin and the amount of the masterbatch such that they are supplied at a predetermined mixture ratio. The natural resin and the masterbatch are then air-transported to the cyclones 10 and 11 by the air transporters 17 and 18, respectively. When it is detected by the upper limit level meter 13 that the level of the pellets has reached the upper limit level of the pipe 9, the natural resin feeder 15 and the masterbatch feeder 16 are stopped. The natural resin pellets have a specific gravities and a shape different from those of the masterbatch pellets. Therefore, the amount of air from the air transporters 17 and 18, the timings at which the feeders 15 and 16 start their supply operations, and the like are changed or controlled when the natural resin and the masterbatch are supplied from the feeders 15 and 16, respectively, such that the natural resin pellets and the masterbatch pellets simultaneously fall down into the pipe 9 at the predetermined mixture ratio.

Figure 2:
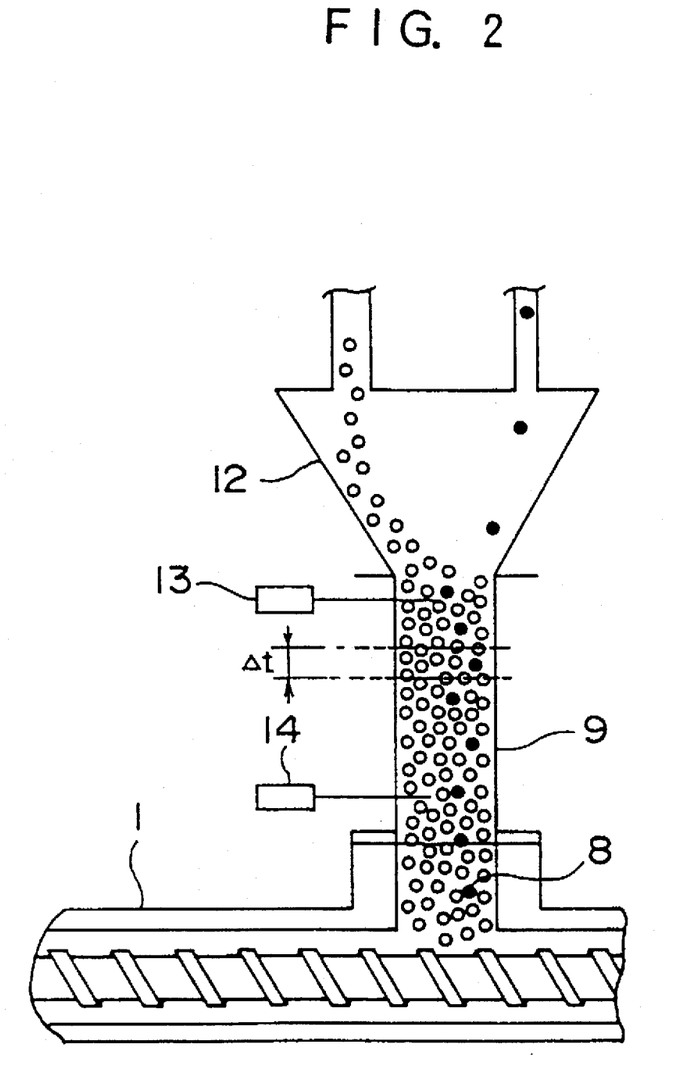
FIG. 2 is a detailed sectional view showing a part of the automatic molding-material supply apparatus shown in FIG. 1.

FIG. 2 shows a state when the natural resin and the masterbatch are supplied to the pipe 9. When the supply speeds of the natural resin and the masterbatch are controlled such that they simultaneously reach the chute 12 and the mixture ratio becomes a predetermined mixture ratio R, the natural resin and the masterbatch in the pipe 9 move downward together at the same speed while maintaining the predetermined mixture ratio R, even if the specific gravities and shapes of pellets of the natural resin and the masterbatch differ from each other. Because the level of the pellets stored in the pipe 9 is maintained between the upper limit level meter 13 and the lower limit level meter 14, i.e., in a region where the cylindrical cross-sectional area is constant. Accordingly, the mixture ratio between the natural resin and the masterbatch becomes R in all axially divided regions of the pipe 9 each having a unit length δt. In addition, when the cross-sectional area of the pipe 9 connected to the raw material supply port 8 does not change greatly, the level of the pellets moves downward uniformly while maintaining the horizontal pellet surface. Accordingly, the mixture ratio R between the natural resin and the masterbatch is maintained until reaching the raw material supply port 8.

Although the pipe 9 has a cylindrical tubular shape in this embodiment, the pipe 9 may have, for example, a square tubular shape having a square cross section. The essential feature is that the pipe 9 has a tubular shape whose cross-sectional area is a generally constant from the top end to the bottom end.

Even when it is desired to supply the same natural resin and masterbatch to a plurality of molding machines, such a supply operation can be performed using a single natural resin feeder and a single masterbatch feeder in the present invention. For example, in the case where the natural resin and the masterbatch are supplied to another molding machine other than the molding machine shown in FIG. 1, air transporters 19 and 20 (see FIG. 1) are provided in addition to the air transporters 17 and 18. The air transporters 19 and 20 are connected to the other molding machine which is not shown in FIG. 1. In this case, a pipe longer than the pipe 9 is attached to each of the molding machines so as to store a sufficiently large amount of pellets in each pipe between the upper limit level and the lower limit level. The switchover from the air transporters 17 and 18 to the air transporters 19 and 20 is performed while a sufficient amount of pellets are stored in the pipe of the molding machine shown in FIG. 1. With this operation, the pellets are supplied from the natural resin feeder 15 and the masterbatch feeder 16 to the other unillustrated molding machine.

Second Embodiment

Figure 3:
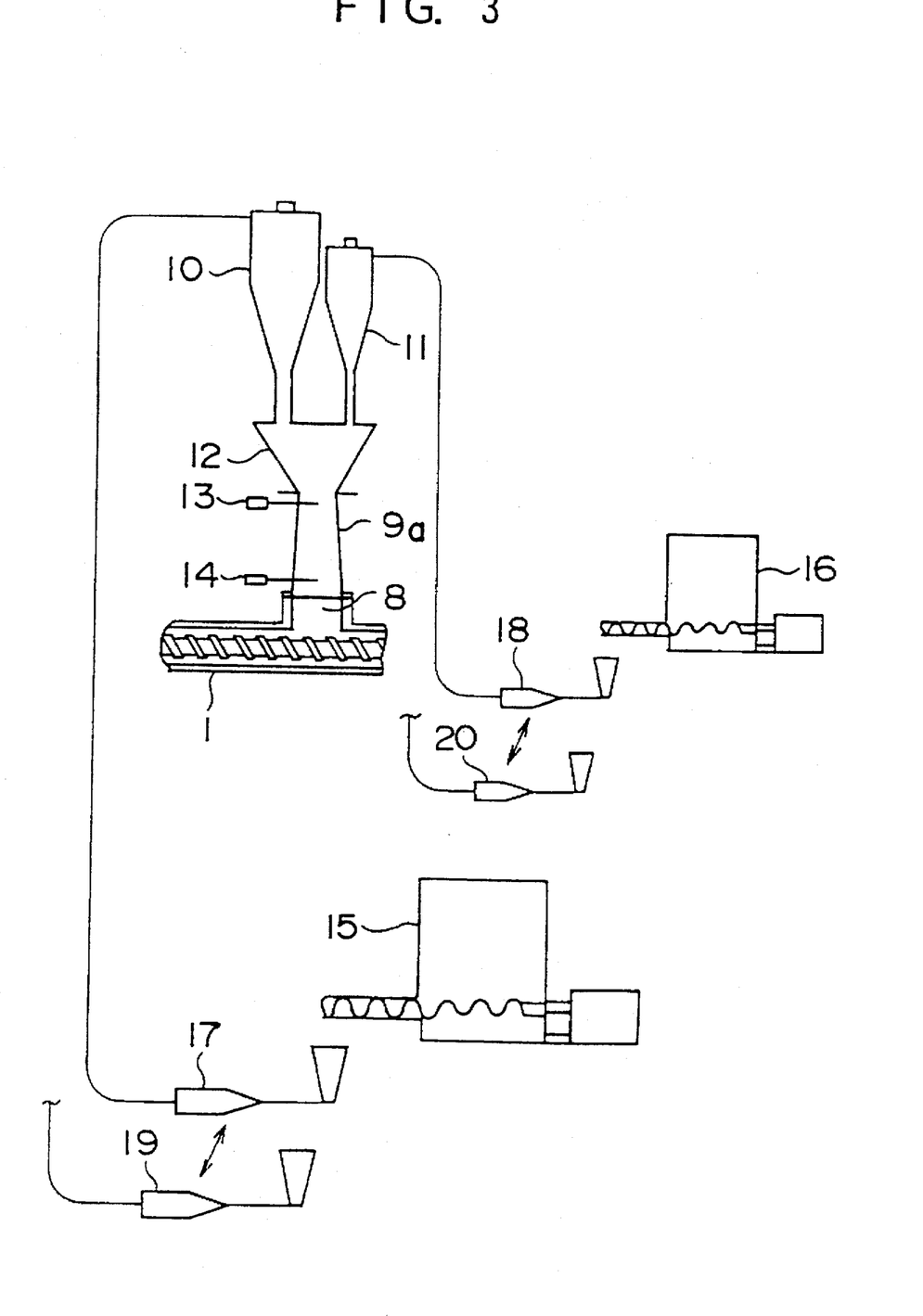
FIG. 3 is a schematic illustration showing a second embodiment of the automatic molding-material supply apparatus according to the present invention.
Figure 4:
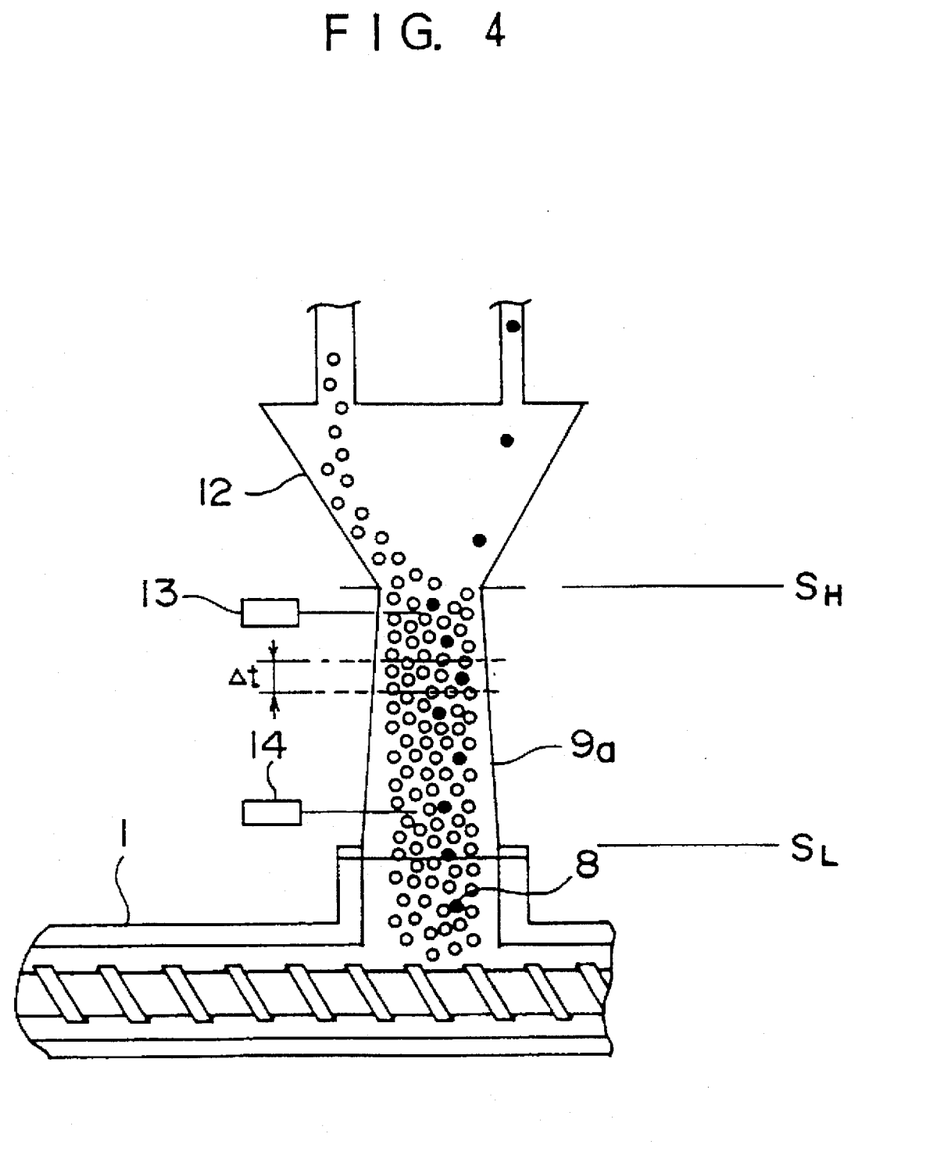
FIG. 4 is a detailed sectional view showing a part of the automatic molding-material supply apparatus shown in FIG. 3.

FIGS. 3 and 4 show a second embodiment of the present invention. The second embodiment is the same as the first embodiment shown in FIG. 1 excepting the shape of the pipe. A pipe 9a used in the present embodiment has a trapezoidal vertical (or longitudinal) cross section. That is, the cross-sectional area SL at the lower end of the pipe 9a is larger than the cross-sectional area SH at the upper end of the pipe 9a, and the cross-sectional area continuously increases from the upper end toward the lower end. Even though the pipe 9a has such a trapezoidal vertical cross section, the natural resin and the masterbatch can be supplied to the raw material supply port at a predetermined mixture ratio. In this case, the cross-sectional area SH at the upper end can be further reduced in so far as the upper end allows the natural resin and the master batch to freely pass therethrough.

Third Embodiment

Figure 5:
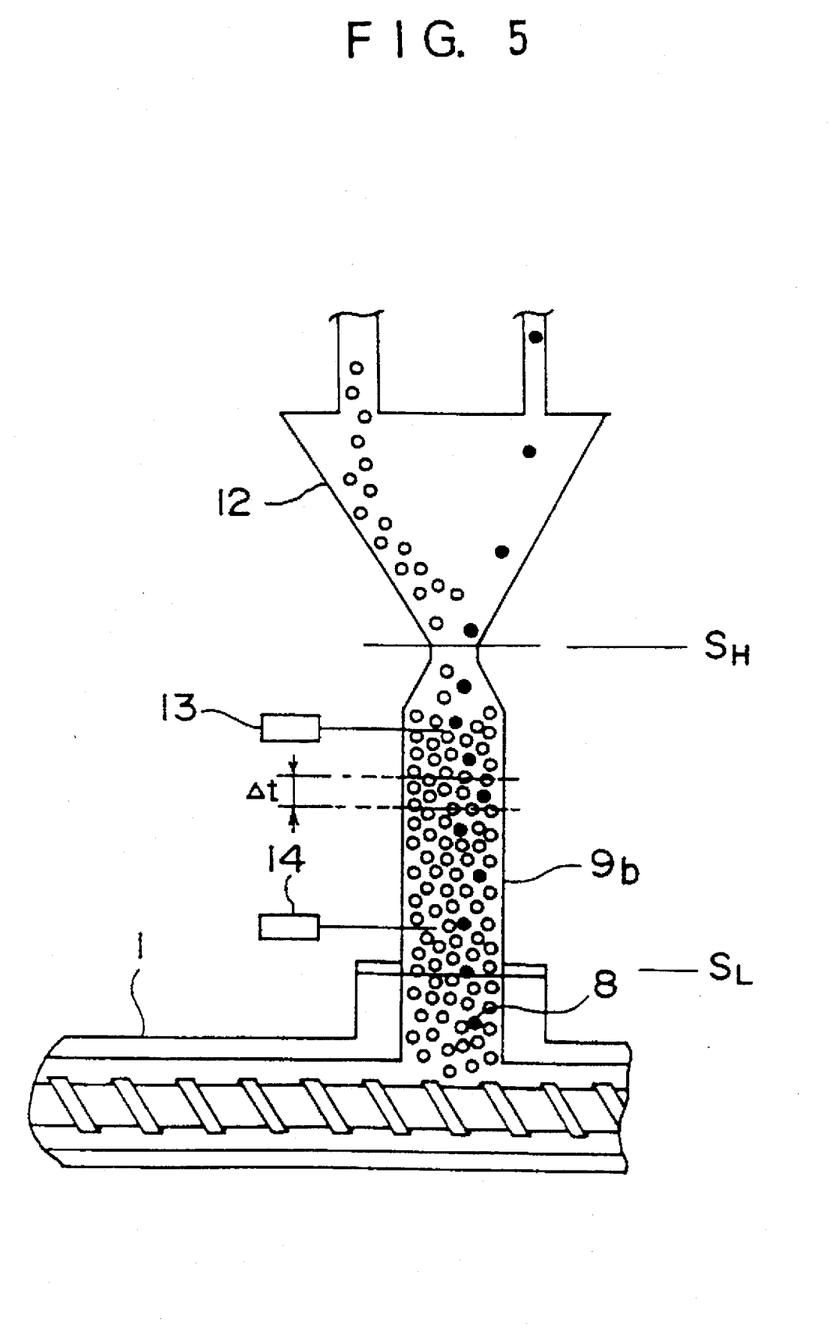
FIG. 5 is a sectional view showing a third embodiment of the automatic molding-material supply apparatus according to the present invention.

FIG. 5 shows a third embodiment of the present invention. A pipe 9b used in the present embodiment has a cross-sectional area which is SH at the upper end, continuously increases to SL toward an intermediate portion, and is constant between the intermediate portion and the lower end. In this case, the intermediate position is preferably selected to be above the upper limit level meter 13 so as to increase the storage capacity of the pipe 9b.

As described above, since the present invention does not use a mixer having an agitating blade, the labor and time required for washing the apparatus before changing the kind of parts can be greatly reduced. Accordingly, the kind of parts can be easily changed even in a small lot production for variety of parts. Also, when a natural resin and a masterbatch are supplied to a plurality of molding machines by using a single natural resin feeder and a single masterbatch feeder, the cost of the molding material supply apparatus per a molding machine can be greatly reduced.

What is claimed is:

1. A method of automatically supplying a molding material to a molding machine, comprising the steps of:
   (a) introducing natural resin pellets fed from a natural resin pellet feeder to a vertical pipe structure at an upper part thereof, said pipe structure having a lower end connected to a supply port of the molding machine and having a wall downwardly flared or vertical, so that cross-sectional areas are substantially equal in a vertical direction or greater at a lower part than at an upper part;
   (b) introducing, simultaneously with said natural resin pellets, masterbatch pellets fed from a masterbatch feeder to said pipe structure at an upper part thereof;
   (c) permitting said natural resin pellets and said masterbatch pellets introduced from the respective feeders to fall continuously until reaching a feed build-up thereof formed in said pipe structure;
   (d) supplying said natural resin pellets and said masterbatch pellets of said feed build-up, as a molding material, to the molding machine, wherein said pellets in said feed build-up move downward in said pipe structure along said vertical or downwardly flared wall; and
   (e) controlling the level of said feed build-up between an upper part and a lower part of said pipe structure by discontinuing steps (a)–(c) when the level of said feed build-up reaches a predetermined upper-limit level, and starting steps (a)–(c) when the level of said feed build-up reaches a predetermined lower-limit level.

2. A method of automatically supplying a molding material according to claim 1, wherein said pipe structure has a tubular shape having a substantially constant cross-sectional area at all axial positions from the upper portion to the lower portion.

3. A method of automatically supplying a molding material according to claim 1, wherein said pipe structure has a trapezoidal vertical section so that the cross-sectional area of said pipe continuously increases from the top portion toward the lower portion.

4. A method of automatically supplying a molding material according to claim 1, wherein the cross-sectional area of said pipe structure continuously increases from the upper portion toward an intermediate portion and is substantially constant between the intermediate portion and the lower portion.

5. A method of automatically supplying a molding material according to claim 4, wherein said intermediate portion is above the position of said upper limit level meter.

6. A method of automatically supplying a molding material according to claim 2, wherein said molding material is supplied to said pipe structure through a chute provided above said pipe.

7. A method of automatically supplying a molding material according to claim 6, wherein said chute is provided with a cyclone for natural resin and a cyclone for masterbatch, and said natural resin pellets and said masterbatch pellets are air-transported by respective air transporters from said natural resin feeder and said masterbatch feeder to said cyclone for natural resin and said cyclone for masterbatch via respective tubes and are supplied to said chute from said respective cyclones.

8. A method of automatically supplying a molding material according to claim 1, wherein said molding material is supplied to a plurality of molding machines from a single natural resin feeder and a single masterbatch feeder.

9. A method of automatically supplying a molding material to a molding machine, comprising the steps of:

(a) introducing natural resin pellets fed from a natural resin pellet feeder to a vertical pipe structure having an upper end via a chute connected to said upper end of said pipe structure, said pipe structure having a lower end connected to a supply port of the molding machine and having a wall downwardly flared or vertical, so that cross-sectional areas are substantially equal in a vertical direction or greater at a lower part than at an upper part;

(b) introducing, simultaneously with said natural resin pellets, masterbatch pellets fed from a masterbatch feeder to said pipe structure via said chute;

(c) permitting said natural resin pellets and said masterbatch pellets introduced from the respective feeders to fall continuously until reaching a feed build-up thereof formed in said pipe structure;

(d) supplying said natural resin pellets and said masterbatch pellets of said feed build-up, as a molding material, to the molding machine, wherein said pellets in said feed build-up move downward in said pipe structure along said vertical or downwardly flared wall; and (e) controlling the level of said feed build-up between an upper part and a lower part of said pipe structure by discontinuing steps (a)–(c) when the level of said feed build-up reaches a predetermined upper-limit level, and starting steps (a)–(c) when the level of said feed build-up reaches a predetermined lower-limit level.

10. A method of automatically supplying a molding material according to claim 9, wherein said pipe structure has a tubular shape having a substantially constant cross-sectional area at all axial positions from the upper portion to the lower portion.

11. A method of automatically supplying a molding material according to claim 9, wherein said pipe structure has a trapezoidal vertical section so that the cross-sectional area of said pipe continuously increases from the top portion toward the lower portion.

12. A method of automatically supplying a molding material according to claim 9, wherein the cross-sectional area of said pipe structure continuously increases from the upper portion toward an intermediate portion and is substantially constant between the intermediate portion and the lower portion.

13. A method of automatically supplying a molding material according to claim 12, wherein said intermediate portion is above the position of said upper limit level meter.

14. A method of automatically supplying a molding material according to claim 9, wherein said chute is provided with a cyclone for natural resin and a cyclone for masterbatch, and said natural resin pellets and said masterbatch pellets are air-transported by respective air transporters from said natural resin feeder and said masterbatch feeder to said cyclone for natural resin and said cyclone for masterbatch via respective tubes and are supplied to said chute from said respective cyclones.

15. A method of automatically supplying a molding material according to claim 9, wherein said molding material is supplied to a plurality of molding machines from a single natural resin feeder and a single masterbatch feeder.

16. An apparatus for automatically supplying a molding material to a molding machine, comprising:

a vertical pipe structure having an upper end and a lower end, through which natural resin pellets and masterbatch pellets will pass downwardly, said lower end being adapted to be connected to the molding machine, said pipe structure having a wall downwardly flared or vertical, so that cross-sectional areas are substantially equal in a vertical direction or greater at a lower part than at an upper part, wherein said natural resin pellets and said masterbatch pellets introduced from the respective feeders will fall continuously until reaching a feed build-up thereof formed in said pipe structure;

an upper-limit level meter provided at an upper part of said pipe structure for detecting the level of the feed build-up in said pipe structure when reaching a predetermined upper-limit level;

a lower-limit level meter provided at a lower part of said pipe structure for detecting the level of the feed build-up in said pipe structure when reaching a predetermined lower-limit level;

a chute for guiding natural resin pellets and masterbatch pellets to said pipe structure, said chute being connected to said upper end of said pipe structure;

a natural resin feeder for supplying natural resin pellets to said chute;

a masterbatch feeder for supplying masterbatch pellets to said chute; and a supply control mechanism for controlling the level of the feed build-up between said predetermined upper-limit level and said predetermined lower-limit level by inactivating said natural resin feeder and said masterbatch feeder when the level of the feed build-up reaches said predetermined upper-limit level, and by activating said natural resin feeder and said masterbatch feeder when the level of the feed build-up reaches said predetermined lower-limit level.

17. An apparatus for automatically supplying a molding material according to claim 16, wherein said pipe structure has a tubular shape having a substantially constant cross-sectional area at all axial positions from the upper portion to the lower portion.

18. An apparatus for automatically supplying a molding material according to claim 16, wherein said pipe structure has a trapezoidal vertical section so that the cross-sectional area of said pipe continuously increases from the top portion toward the lower portion.

19. An apparatus for automatically supplying a molding material according to claim 16, wherein the cross-sectional area of said pipe structure continuously increases from the upper portion toward an intermediate portion and is substantially constant between the intermediate portion and the lower portion.

20. An apparatus for automatically supplying a molding material according to claim 19, wherein said intermediate portion is above the position of said upper limit level meter.

* * * * *